United States Patent
Gattu

(10) Patent No.: US 10,326,603 B2
(45) Date of Patent: Jun. 18, 2019

(54) INTER-WORKSPACE COMMUNICATIONS

(71) Applicant: BlackBerry Limited, Waterloo (CA)

(72) Inventor: Balasubrahmanyam Gattu, San Ramon, CA (US)

(73) Assignee: BlackBerry Limited, Waterloo, Ontario (CA)

( * ) Notice: Subject to any disclaimer, the term of this patent is extended or adjusted under 35 U.S.C. 154(b) by 181 days.

(21) Appl. No.: 15/148,718

(22) Filed: May 6, 2016

(65) Prior Publication Data

US 2017/0324565 A1    Nov. 9, 2017

(51) Int. Cl.
| | | |
|---|---|---|
| G06F 21/74 | (2013.01) | |
| H04L 29/06 | (2006.01) | |
| H04L 9/00 | (2006.01) | |
| H04L 9/32 | (2006.01) | |
| H04L 9/14 | (2006.01) | |
| H04L 9/30 | (2006.01) | |
| H04W 88/02 | (2009.01) | |
| G06F 21/57 | (2013.01) | |

(52) U.S. Cl.
CPC ............ *H04L 9/3263* (2013.01); *G06F 21/57* (2013.01); *G06F 21/74* (2013.01); *H04L 9/006* (2013.01); *H04L 9/14* (2013.01); *H04L 9/30* (2013.01); *H04L 63/0823* (2013.01); *H04L 63/10* (2013.01); *H04L 63/1433* (2013.01); *H04L 63/20* (2013.01); *H04W 88/02* (2013.01)

(58) Field of Classification Search
CPC ... H04L 9/3263; H04L 63/20; H04L 63/1433; H04L 63/0823; H04W 88/02; G06F 21/74; G06F 21/57
See application file for complete search history.

(56) References Cited

U.S. PATENT DOCUMENTS

| | | | |
|---|---|---|---|
| 8,736,299 B1 | 5/2014 | Pedersen | |
| 8,898,459 B2 | 11/2014 | Chawla et al. | |
| 8,997,054 B2 | 3/2015 | Huff et al. | |
| 9,055,041 B2 | 6/2015 | Doyle et al. | |
| 9,077,725 B2 | 7/2015 | Tuch et al. | |
| 9,087,191 B2 | 7/2015 | Deasy et al. | |
| 9,166,970 B1 | 10/2015 | Dundas et al. | |
| 2005/0198306 A1* | 9/2005 | Palojarvi | H04L 63/0272 709/227 |
| 2006/0200814 A1* | 9/2006 | Kontinen | G06F 8/61 717/168 |
| 2007/0277248 A1 | 11/2007 | Agrawal et al. | |

(Continued)

OTHER PUBLICATIONS

Extended European Search Report issued in European Application No. 17168198.4 dated Oct. 2, 2017; 7 pages.

*Primary Examiner* — Daniel B Potratz
*Assistant Examiner* — Vu V Tran
(74) *Attorney, Agent, or Firm* — Fish & Richardson P.C.

(57) ABSTRACT

Systems, methods, and software can be used to access an enterprise resource. In some aspects, configuration information for an enterprise application is received at an enterprise mobility management (EMM) client on a mobile device. A certificate that includes at least a portion of the configuration information is generated. The certificate is installed in an enterprise workspace on the mobile device. A configuration application is executed in the enterprise workspace on the mobile device to configure the enterprise application.

17 Claims, 2 Drawing Sheets

(56) References Cited

U.S. PATENT DOCUMENTS

| | | | |
|---|---|---|---|
| 2013/0055340 A1* | 2/2013 | Kanai | G06F 21/53 |
| | | | 726/1 |
| 2014/0032691 A1* | 1/2014 | Barton | H04L 41/00 |
| | | | 709/206 |
| 2014/0032759 A1* | 1/2014 | Barton | H04L 67/10 |
| | | | 709/225 |
| 2014/0059703 A1 | 2/2014 | Hung et al. | |
| 2014/0344446 A1 | 11/2014 | Rjeili et al. | |
| 2015/0358301 A1 | 12/2015 | Dalbehera et al. | |
| 2017/0064549 A1* | 3/2017 | Rykowski | H04W 4/14 |
| 2017/0250977 A1* | 8/2017 | Turner | H04L 67/30 |
| 2017/0288959 A1* | 10/2017 | Kelley | H04L 41/0803 |

* cited by examiner

INTER-WORKSPACE COMMUNICATIONS

BACKGROUND

The present disclosure relates to using certificates to communicate between workspaces. Many electronic devices, e.g., mobile devices or other computing systems, use workspace to manage access to resources stored on the electronic devices. For example, an electronic device can have a personal workspace for a user's personal data and applications, and an enterprise workspace for a user's enterprise data and applications.

DESCRIPTION OF DRAWINGS

Like reference numbers and designations in the various drawings indicate like elements.

DETAILED DESCRIPTION

Figure 1:
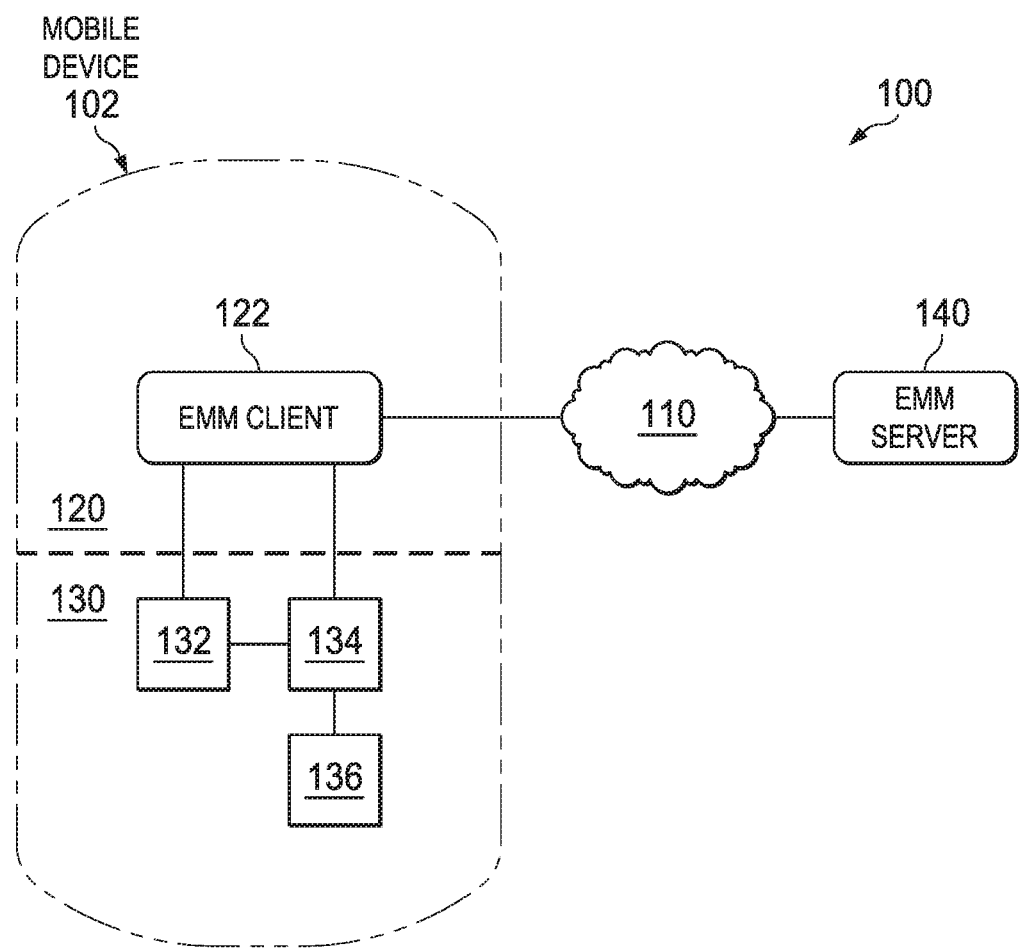
FIG. 1 is a schematic diagram showing an example communication system that provides inter-workspace communications according to an implementation.

Using workspace to manage resources on an electronic device can help enterprises reduce the risk that enterprise resources may be accessed by, for example, malicious or vulnerable applications. For example, enterprises can give users the freedom to install their personal application in a personal workspace, while controlling access to resources associated with an enterprise workspace. In some cases, a workspace can be referred to as a "profile."

In general, workspaces can be implemented as groups of resources having a common management scheme, where each workspace generally includes one or more resources and one or more policies regarding use of or access to the one or more resources. Workspaces can be implemented on data communication systems that include a device and can be used to logically separate resources, e.g., files, applications, network connections, data, and the like, on the device. For example, the device can implement two or more workspaces, which can include a personal workspace, an enterprise workspace, or a combination of these and other types of workspaces. In some implementations, the device may include multiple personal workspaces, multiple enterprise workspaces, or both. A personal workspace can be managed by a device user, and an enterprise workspace can be managed by an enterprise or corporate administrator, e.g., using an enterprise mobility management (EMM) server. In some implementations, the enterprise or corporate administrator can additionally manage the personal workspace, the device, or both.

In some implementations, each workspace on a device (e.g., enterprise or personal) has its own file system on the device, and separation between workspaces can be provided, at least partially, by the separation of the file systems on the device. In some cases, some of the resources of each workspace (e.g., data and policies) are stored in a dedicated file system for the workspace, while other resources of each workspace (e.g., applications) are stored outside of the dedicated file system.

Separation of file systems can be logical, physical, or both. A physical separation of file systems can be implemented, for example, by designating physically separate memory locations (e.g., separate memory devices or separate blocks in the same memory) for each file system. A logical separation of file systems can be implemented, for example, by designating logically separate data structures (e.g., separate directories, etc.) for each file system. In some implementations, each file system has its own encryption parameters. For example, the file system for a corporate workspace can have its own encryption key and a higher encryption strength, while a file system for a personal workspace can have its own encryption key and lower encryption strength. In some instances, the file system for the personal workspace has the same encryption strength as the corporate workspace, or the file system for the personal workspace can be unencrypted.

As described above, a workspace can include a group of resources that share a common management scheme governing the use of resources in the group and can encompass both the resources and the management policies that describe how the resources may be used. The management policies can include security policies, which can be defined for the workspace. Applications executable by the device can include resources that, when executed, request access to other resources or provide resources to other applications (or both). For an application that is assigned to, or associated with a workspace, resources included in the application can be included in the group of resources included in the workspace. Furthermore, security policies defined for the profile can restrict the application to resources included in the group. Thus, when the application is executed within the workspace, security policies included in the management policies of the workspace can determine whether or not the resources associated with the application can access other resources, such as resources included in the group or resources outside the group (or both), or grant access to other applications, such as applications assigned to or associated with, or not assigned to or associated with the profile (or both).

In some cases, communications across the workspaces can be provided through workspace management application program interfaces (APIs). Examples of cross-workspace communication can include passing configuration information from a first workspace to a second workspace. The configuration information can be used to configure an application in the second workspace. For example, a device manufacturer can develop and provide APIs for an application operating in the personal workspace, e.g., an EMM client, to install and configure a selection of resources in the enterprise workspace. The selection of resources can include resources commonly used by an enterprise. For example, the device manufacturer can provide an API for the EMM client to install a certificate into the enterprise workspace. The device manufacturer can provide an API for the EMM client to configure an enterprise email application, an enterprise calendar application, or an enterprise virtual private network (VPN) connection. In some cases, the security policy of the enterprise workspace can restrict the types of the applications that can use these APIs. For example, the security policy can control that only the EMM client that creates the enterprise workspace can use the API to install a certificate in the enterprise workspace.

However, the device manufacturer may provide cross-workspace communication APIs for a limited number of applications, which may not include many applications developed by third-parties. Therefore, it may be difficult for the EMM client operating in the personal workspace to pass configuration information into the enterprise workspace to configure an enterprise application developed by a third party.

In some cases, a configuration application can be created and installed in the enterprise workspace. Because the configuration application operates in the same workspace as the enterprise application, the configuration application can be used to configure the enterprise application. In some cases, the configuration application can be configured to download configuration information from an EMM server. However, such an operation may be time consuming and, therefore, may impact the user experience.

Figure 2:
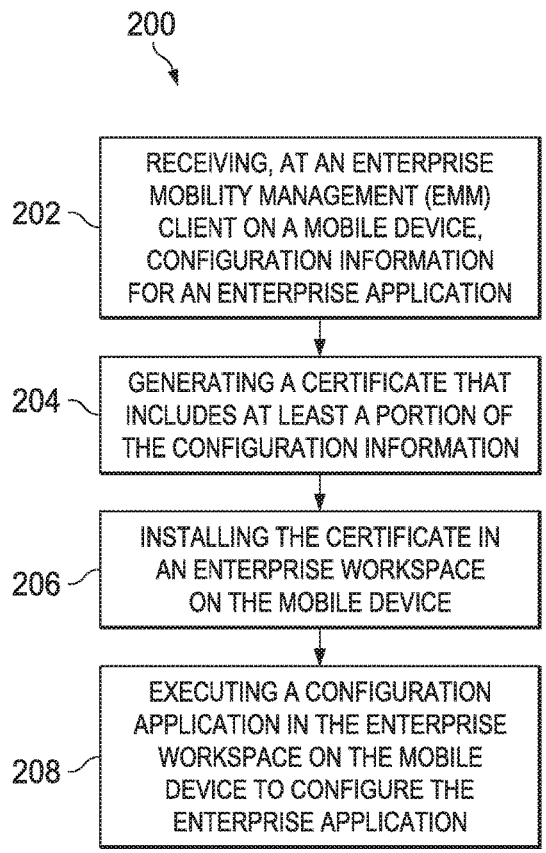
FIG. 2 is a flow diagram showing an example process for configuring an application across workspaces according to an implementation.
Figure 3:
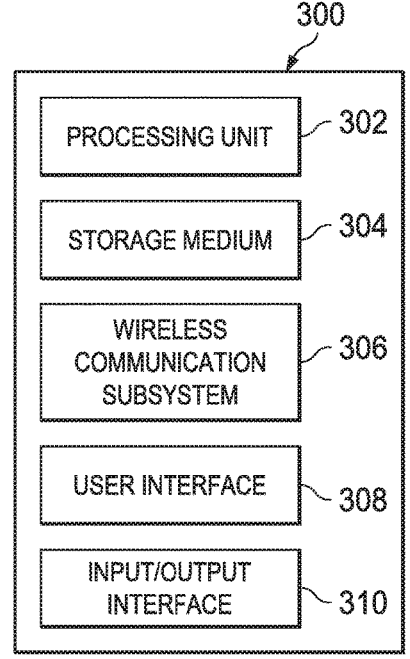
FIG. 3 is a block diagram illustrating an example mobile device according to an implementation.

In general, a certificate can be used for security functions, e.g., identity, encryption, integrity, authentication, and non-repudiation functions. In one example, in a public-key infrastructure (PKI), a public key certificate can be used to prove the identity of an owner of the public key. The public key certificate can include information about the key, information about the key owner's identity, and the digital signature of an entity that has verified that the certificate's contents are correct. In some cases, instead of including authentication information, a certificate can include configuration information. The certificate can be generated in a first workspace and installed in a second workspace using the API to install certificates across workspaces. The applications in the second workspace, e.g., a configuration application, can therefore access the information included in the certificate. FIGS. 1-3 and associated descriptions provide additional details of these implementations.

Using the certificate to facilitate cross-workspace communications can provide one or more advantages. For example, the enterprise workspace can be configured to disallow applications other than the EMM client that creates the workspace to install a certificate into the workspace. Therefore, this approach can provide a secure inter-workspace communication while simplifying the development effort for inter-workspace communication.

FIG. 1 is a schematic diagram showing an example communication system 100 that provides inter-workspace communications according to an implementation. The example communication system 100 includes a mobile device 102 that is communicatively coupled with an enterprise mobility management (EMM) server 140 over a communication network 110.

The EMM server 140 represents an application, set of applications, software, software modules, hardware, or any combinations thereof that can be configured to manage applications and devices for an enterprise. For example, the EMM server 140 can install, update, and manage the license of enterprise applications. In some cases, the EMM server 140 can include an application store for the enterprise applications. In some cases, the EMM server 140 can include a database for the authorization status of users and mobile devices that can access the enterprise resources. The EMM server 140 can send configuration information to the mobile device 102 to configure applications operating on the mobile device 102.

The example communication system 100 includes the mobile device 102. As shown in FIG. 1, the mobile device 102 includes two workspaces, a personal workspace 120 and an enterprise workspace 130. The mobile device 102 can also include additional workspaces.

The personal workspace 120 can be a workspace that include resources, e.g., applications and files, configured for personal use. For example, the personal workspace 120 can include games and apps downloaded by a user of the mobile device 102 for personal use. The personal workspace 120 can also include information records, e.g., contact information, or multiple files, e.g., music, photos, or videos, for personal use.

The personal workspace 120 includes an EMM client 122. The EMM client 122 represents an application, set of applications, software, software modules, hardware, or any combinations thereof that can be configured to manage enterprise services on the mobile device 102. In some cases, the EMM client 122 can communicate with the EMM server 140 over the network 110 to manage enterprise services on the mobile device 102. For example, the EMM client 122 can create an enterprise workspace, e.g., the enterprise workspace 130. The EMM client 122 can also configure the enterprise applications operating in the enterprise workspace 130 using certificates. FIG. 2 and associated descriptions provide additional details of these implementations.

The enterprise workspace 130 can be a workspace that includes resources, e.g., applications and files, configured to be used for an enterprise. For example, the enterprise workspace 130 can include enterprise applications, e.g., enterprise email applications, enterprise messaging applications, or production software, that are associated with the enterprise. The enterprise workspace 130 can also include information records, e.g., working files or corporate contact directories, associated with the enterprise.

The enterprise workspace 130 includes a certificate 132, a configuration application 134, and an enterprise application 136. The certificate 132 can include configuration information for the enterprise application 136. The configuration information can include security related configuration information or any other configuration information for the enterprise applications. In some cases, the certificate 132 can be generated by the EMM client 122 and installed into the enterprise workspace 130. FIG. 2 and associated descriptions provide additional details of these implementations.

The configuration application 134 represents an application, set of applications, software, software modules, hardware, or any combinations thereof that can configure the applications in the enterprise workspace 130, e.g., the enterprise application 136. In some implementations, the configuration application can be an extension of the EMM client.

As shown in FIG. 1, the example communication system includes the communication network 110. The communication network 110 can include a wireless network, a wireline network, or a combination thereof. The communication network 110 can include one or a plurality of radio access networks (RANs), core networks (CNs), and external networks. The RANs may comprise one or more radio access technologies. In some implementations, the radio access technologies may be Global System for Mobile communication (GSM), Interim Standard 95 (IS-95), Universal Mobile Telecommunications System (UMTS), CDMA2000 (Code Division Multiple Access), Evolved Universal Mobile Telecommunications System (E-UMTS), Long Term Evaluation (LTE), or LTE-Advanced. In some instances, the core networks may be evolved packet cores (EPCs).

A RAN is part of a wireless telecommunication system which implements a radio access technology, such as UMTS, CDMA2000, 3GPP LTE, and 3GPP LTE-A. In many applications, a RAN includes at least one base station. A base station may be a radio base station that may control all or at least some radio-related functions in a fixed part of the system. The base station may provide radio interface within their coverage area or a cell for the mobile device 102 to communicate. The base station may be distributed throughout the cellular network to provide a wide area of coverage. The base station directly communicates to one or a plurality of mobile devices, other base stations, and one or more core network nodes. The base station may operate on any of the different wireless communication technologies. Example wireless technologies include Global System for Mobile Communication (GSM), Universal Mobile Telecommunications System (UMTS), 3GPP Long Term Evolution (LTE), LTE-Advanced (LTE-A), wireless broadband communication technologies, and others. Example wireless broadband communication systems include IEEE 802.11 wireless local area network, IEEE 802.16 WiMAX network, and others.

In operation, the mobile device 102 can receive configuration information for the enterprise application 136. The EMM client 122 can generate the certificate 132. The certificate 132 can include at least a portion of the configuration information. The certificate 132 can be installed in the enterprise workspace 130. The configuration application 134 can retrieve at least the portion of the configuration information from the certificate 132 and configure the enterprise application 136 based on the retrieved configuration information. FIG. 2 and associated descriptions provide additional details of these implementations.

Turning to a general description, a mobile device, e.g., the mobile device 102, may be referred to as mobile electronic device, user device, mobile station, subscriber station, portable electronic device, mobile communications device, wireless modem, or wireless terminal. Examples of a mobile device (e.g., the mobile device 102) may include a cellular phone, personal data assistant (PDA), smart phone, laptop, tablet personal computer (PC), pager, portable computer, portable gaming device, wearable electronic device, or other mobile communications device having components for communicating voice or data via a wireless communication network. The wireless communication network may include a wireless link over at least one of a licensed spectrum and an unlicensed spectrum. The term "mobile device" can also refer to any hardware or software component that can terminate a communication session for a user. In addition, the terms "user equipment," "UE," "user equipment device," "user agent," "UA," "user device," and "mobile device" can be used synonymously herein.

FIG. 2 is a flow diagram showing an example process 200 for configuring an application across workspaces according to an implementation. The process 200 can be implemented by any type of system or module that accesses enterprise resources. For example, the process 200 can be implemented by the mobile device 102 shown in FIG. 1. The example process 200, shown in FIG. 2, can also be implemented using additional, fewer, or different operations, which can be performed in the order shown or in a different order.

The example process 200 begins at 202, where an enterprise mobility management (EMM) client on a mobile device receives configuration information for an enterprise application. The configuration information can be sent by an EMM server that manages the installation and services of the enterprise application for mobile stations associated with an enterprise. The configuration information can include security related configuration information for the enterprise applications. Examples of the security related configuration information can include security parameters, e.g., parameters related to security protocol and security procedure used by the enterprise application. Examples of the security related configuration information can also include security credentials, e.g., username and password associated with a user of the mobile device that can access the enterprise application. The configuration information can also include an address, e.g., an Internet Protocol (IP) address, a Uniform Resource Locator, a port number, or any combinations thereof, of a server that provides service to the enterprise application, a time zone setting, a data synchronization or connection frequency, or any other configuration information.

In some cases, at least two workspaces, e.g., an enterprise workspace and a personal workspace, can be configured on the mobile device. The EMM client can operate in the personal workspace, while the enterprise application can operate in the enterprise workspace. In some cases, the enterprise workspace is created by the EMM client. For example, the EMM client can receive, e.g., from the EMM server associated with an enterprise, configuration information for an enterprise workspace. The EMM client can then create an enterprise workspace for the enterprise on the mobile device using the configuration information for the enterprise workspace.

At 204, the EMM client generates a certificate that includes the configuration information for the enterprise application. For example, the certificate can include a title. The title can include a name or an identifier of the enterprise application. The title can also indicate that the certificate includes configuration information and therefore is used for configuration purpose instead of authentication purpose. The certificate can also include a body. The body can include the configuration information, e.g., the security related configuration information, for the enterprise application. In some cases, the configuration information can be plaintext that describes the configuration information.

In some cases, the length of a certificate can be limited and the configuration information for the enterprise application can exceed the limited length of the certificate. In these or other cases, more than one certificate can be generated for the enterprise application. For example, a first certificate can include a first portion of the configuration information, and additional certificates, e.g., a second or a third certificate, can include the remaining portion of the configuration information. In some cases, the certificate can identify, e.g., in the title, both the enterprise application and the sequence of the configuration information included in the certificate. For example, the title of the first certificate can indicate the name of the enterprise application and that the information included in the certificate is the first portion.

In some cases, a certificate can include configuration information of more than one applications. In these or other cases, the certificate can identify, e.g., in the title, each of the more than one applications.

At 206, the certificate generated at 204 is installed in the enterprise workspace. In some cases, the certificate is installed into the enterprise workspace using an API available for certificate installation.

At 208, a configuration application is executed to configure the enterprise application using the certificate. The configuration application can operate in the enterprise workspace and configure applications in the enterprise workspace. In some implementation, the configuration application can be an extension of the EMM client.

In some cases, the execution of the configuration application can be triggered based on an event. For example, after the EMM client installed the certificate, the EMM client can send a configuration command to the configuration application to initiate the configuration. The configuration command can be sent through an available API for starting an application inside the enterprise workspace by the EMM Client running in the personal workspace. In some cases, a configuration application can be used to configure a particular application. Alternatively or in combination, a configuration application can be used to configure more than one application. The configuration command can identify the application, e.g., using the name, the identifier, or a combination thereof, to be configured. In some cases, the configuration command can identify more than one applications to be configured.

When the configuration application is executed, the configuration application can access the certificates in the enterprise workspace to retrieve configuration information for each of the application to be configured. In some cases, more than one certificates can be installed in the enterprise workspace. In these or other cases, the configuration application can search the installed certificates to find certificates that include the configuration information for the application to be configured. For example, the configuration application can search for the certificate indicating that the certificate is used for configuration purpose and thus include configuration information. Further, the configuration application can search for the name or the identifier of the application to be configured in the title of the certificates. In some cases, as discussed previously, more than one certificates can be found that include the configuration information of the application to be configured. In some cases, a certificate can be found to include configuration information for more than one applications.

The configuration application can configure the enterprise application based on the retrieved configuration information from the certificate associated with the enterprise application. In some cases, to configure the application, the configuration application can generate a configuration file using the retrieved configuration information. The configuration application can place the configuration file in a directory associated with the enterprise application. Alternatively or additionally, the configuration application can configure the enterprise application using the software development kit (SDK) of the enterprise application. In some cases, an enterprise application developer can make the SDK available publically or to a developer partner, e.g., the developer of the configuration application. The SDK exposes the APIs for configuring the enterprise application for security or other configuration information. The configuration application can use the configuration data received from the certificate to configure the enterprise application by using the APIs available in the SDK.

In some cases, a configuration process can include more than one configuration procedure. For example, a configuration process can include configuring the security procedures for the enterprise application, configuring the username and password, and other procedures. In some cases, the entire configuration process can be performed. For example, after the enterprise application is first installed and the EMM client receives the configuration information from the EMM server, the EMM client can issue a configuration command to perform the entire configuration process. Alternatively or additional, one or more than one particular configuration procedures can be performed. In some cases, the configuration command can be used to identify one or more configuration procedures to be performed. For example, the EMM server can send updated configuration information, e.g., to change a version of an encryption protocol used by the application, to the EMM client. The EMM client can generate and install an updated certificate in the enterprise workspace. The update certificate can include the updated configuration information. The EMM client can start the configuration application using the APIs provided to EMM Client. The configuration application can retrieve the updated configuration information from the updated certificate and perform the authentication configuration procedure based on the updated configuration information.

Alternatively or additionally, the updated certificate can be used to identify the configuration procedure to be performed. For example, the updated certificate can include the updated configuration information and indicate the particular configuration procedure to be performed. The EMM client can trigger the configuration application to start configuration using the APIs available to EMM Client. The configuration application can retrieve the updated certificate and identify the particular configuration procedure to be performed based on the updated certificate. The configuration application can perform the particular configuration procedure based on the updated configuration information.

FIG. 3 is a block diagram illustrating an example mobile device 300 according to an implementation. The illustrated device 300 includes a processing unit 302, a computer-readable storage medium 304 (for example, ROM or flash memory), a wireless communication subsystem 306, a user interface 308, and an I/O interface 310.

The processing unit 302 can include one or more processing components (alternatively referred to as "processors" or "central processing units" (CPUs)) configured to execute instructions related to one or more of the processes, steps, or actions described herein in connection with one or more of the implementations disclosed herein. In some implementations, the processing unit 302 may be configured to generate control information, such as a measurement report, or to respond to received information, such as control information from a network node. The processing unit 302 may also be configured to make a Radio Resource Management (RRM) decision such as cell selection/reselection information, or trigger a measurement report. The processing unit 302 can also include other auxiliary components, such as random access memory (RAM) and read-only memory (ROM). The computer-readable storage medium 304 can store an operating system (OS) of the device 300 and various other computer-executable instructions, logic or software programs for performing one or more of the processes, steps, or actions described above. In some cases, the computer-readable storage medium 304 can be transitory, non-transitory, or a combination thereof.

The wireless communication subsystem 306 may be configured to provide wireless communication for voice, data, and/or control information provided by the processing unit 302. The wireless communication subsystem 306 can include, for example, one or more antennas, a receiver, a transmitter, a local oscillator, a mixer, and a digital signal processing (DSP) unit. In some implementations, the subsystem 306 can support multiple-input multiple-output (MIMO) transmissions. In some implementations, the receiver in the wireless communication subsystems 306 can be an advanced receiver or a baseline receiver. Two receivers can be implemented with identical, similar, or different receiver processing algorithms.

The user interface 308 can include, for example, one or more of a screen or touch screen (for example, a liquid crystal display (LCD), a light emitting display (LED), an organic light emitting display (OLED), a micro-electromechanical system (MEMS) display), a keyboard or keypad, a trackball, a speaker, and a microphone. The I/O interface 310 can include, for example, a universal serial bus (USB) interface.

Some of the subject matter and operations described in this specification can be implemented in digital electronic circuitry, or in computer software, firmware, or hardware, including the structures disclosed in this specification and their structural equivalents, or in combinations of one or more of them. Some of the subject matter described in this specification can be implemented as one or more computer programs, i.e., one or more modules of computer program instructions, encoded on a computer storage medium for execution by, or to control the operation of, the data-processing apparatus. A computer storage medium can be, or can be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The term "data-processing apparatus" encompasses all kinds of apparatus, devices, and machines for processing data, including, by way of example, a programmable processor, a computer, a system on a chip, or multiple ones, or combinations of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, software, software application, script, or code) can be written in any form of programming language, including compiled or interpreted languages, declarative, or procedural languages. A computer program may, but need not, correspond to a file in a file system. A program can be stored in a portion of a file that holds other programs or data (e.g., one or more scripts stored in a markup language document), in a single file dedicated to the program, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some of the processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and processors of any kind of digital computer. Generally, a processor will receive instructions and data from a read-only memory, a random-access memory, or both. A computer can include a processor that performs actions in accordance with instructions and one or more memory devices that store the instructions and data. A computer may also include, or be operatively coupled to receive data from or transfer data to, or both, one or more mass storage devices for storing data, e.g., magnetic disks, magneto optical disks, or optical disks. However, a computer need not have such devices. Devices suitable for storing computer program instructions and data include all forms of non-volatile memory, media and memory devices, including, by way of example, semiconductor memory devices (e.g., EPROM, EEPROM, flash memory devices, and others), magnetic disks (e.g., internal hard disks, removable disks, and others), magneto optical disks , and CD ROM and DVD-ROM disks. In some cases, the processor and the memory can be supplemented by, or incorporated in, special purpose logic circuitry.

To provide for interaction with a user, operations can be implemented on a computer having a display device (e.g., a monitor, or another type of display device) for displaying information to the user and a keyboard and a pointing device (e.g., a mouse, a trackball, a tablet, a touch sensitive screen, or another type of pointing device) by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

A computer system may include a single computing device, or multiple computers that operate in proximity or generally remote from each other and typically interact through a communication network. Examples of communication networks include a local area network ("LAN") and a wide area network ("WAN"), an inter-network (e.g., the Internet), a network comprising a satellite link, and peer-to-peer networks (e.g., ad hoc peer-to-peer networks). A relationship of client and server may arise by virtue of computer programs running on the respective computers and having a client-server relationship to each other.

While this specification contains many details, these should not be construed as limitations on the scope of what may be claimed, but rather as descriptions of features specific to particular examples. Certain features that are described in this specification in the context of separate implementations can also be combined. Conversely, various features that are described in the context of a single implementation can also be implemented in multiple embodiments separately or in any suitable sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementation described above should not be understood as requiring such separation in all implementations, and it should be understood that the described program components and systems can generally be integrated together in a single software product or packaged into multiple software products.

Also, techniques, systems, subsystems, and methods described and illustrated in the various implementations as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

While the above detailed description has shown, described, and pointed out the fundamental novel features of the disclosure as applied to various implementations, it will be understood that various omissions, substitutions, and changes in the form and details of the system illustrated may be made by those skilled in the art, without departing from the intent of the disclosure. In addition, the order of method steps is not implied by the order in which they appear in the claims.

What is claimed is:

1. A method, comprising:
 receiving, at an enterprise mobility management (EMM) client on a mobile device, configuration information for an enterprise application, wherein the EMM client operates in a personal workspace on the mobile device, and the enterprise application operates in an enterprise workspace on the mobile device;
 generating, by the EMM client on the mobile device, a certificate that includes at least a portion of the received configuration information;
 installing the certificate in the enterprise workspace on the mobile device; and
 executing a configuration application in the enterprise workspace on the mobile device to configure the enterprise application, wherein executing the configuration application comprises:
  retrieving the portion of the received configuration information from the certificate; and
  configuring the enterprise application using the retrieved portion of the configuration information.

2. The method of claim 1, wherein the enterprise workspace is created by the EMM client.

3. The method of claim 1, wherein the certificate includes a portion that identifies the enterprise application, and wherein executing the configuration application further comprises:
 searching a plurality of certificates in the enterprise workspace on the mobile device; and
 identifying the certificate associated with the enterprise application based on the portion of the certificate that identifies the enterprise application.

4. The method of claim 1, wherein the certificate is a first certificate, and the portion of the configuration information is a first portion of the configuration information, further comprising:
 generating a second certificate that includes a second portion of the configuration information;
 installing the second certificate in the enterprise workspace on the mobile device; and
 wherein executing the configuration application further comprises:
  retrieving the second portion of the configuration information from the second certificate; and
  configuring the enterprise application using the first and the second portions of the configuration information.

5. The method of claim 1, wherein the certificate includes configuration information for more than one enterprise applications.

6. The method of claim 1, wherein the certificate identifies one or more configurations procedures to be performed by configuration application.

7. The method of claim 1, wherein the configuration information includes security credentials for the enterprise application.

8. A mobile device, comprising:
 a memory; and
 at least one hardware processor communicatively coupled with the memory and configured to:
  receive, at an enterprise mobility management (EMM) client on the mobile device, configuration information for an enterprise application, wherein the EMM client operates in a personal workspace on the mobile device, and the enterprise application operates in an enterprise workspace on the mobile device;
  generate, by the EMM client on the mobile device, a certificate that includes at least a portion of the received configuration information;
  install the certificate in the enterprise workspace on the mobile device; and
  execute a configuration application in the enterprise workspace on the mobile device to configure the enterprise application, wherein executing the configuration application comprises:
   retrieving the portion of the received configuration information from the certificate; and
   configuring the enterprise application using the retrieved portion of the configuration information.

9. The mobile device of claim 8, wherein the enterprise workspace is created by the EMM client.

10. The mobile device of claim 8, wherein the certificate includes a portion that identifies the enterprise application, and wherein executing the configuration application further comprises:
 searching a plurality of certificates in the enterprise workspace on the mobile device; and
 identifying the certificate associated with the enterprise application based on the portion of the certificate that identifies the enterprise application.

11. The mobile device of claim 8, wherein the certificate is a first certificate, the portion of the configuration information is a first portion of the configuration information, and the at least one hardware processor is further configured to:
 generate a second certificate that includes a second portion of the configuration information;
 install the second certificate in the enterprise workspace on the mobile device; and
 wherein executing the configuration application further comprises:
  retrieving the second portion of the configuration information from the second certificate; and
  configuring the enterprise application using the first and the second portions of the configuration information.

12. The mobile device of claim 8, wherein the certificate includes configuration information for more than one enterprise applications.

13. The mobile device of claim 8, wherein the certificate identifies one or more configurations procedures to be performed by configuration application.

14. The mobile device of claim 8, wherein the configuration information includes security credentials for the enterprise application.

15. A non-transitory computer-readable medium containing instructions which, when executed, cause a computing device to perform operations comprising:
 receiving, at an enterprise mobility management (EMM) client on a mobile device, configuration information for an enterprise application, wherein the EMM client operates in a personal workspace on the mobile device, and the enterprise application operates in an enterprise workspace on the mobile device;

generating, by the EMM client on the mobile device, a certificate that includes at least a portion of the received configuration information;

installing the certificate in the enterprise workspace on the mobile device; and executing a configuration application in the enterprise workspace on the mobile device to configure the enterprise application, wherein executing the configuration application comprises:

retrieving the portion of the received configuration information from the certificate; and configuring the enterprise application using the retrieved portion of the configuration information.

16. The non-transitory computer-readable medium of claim 15, wherein the enterprise workspace is created by the EMM client.

17. The non-transitory computer-readable medium of claim 15, wherein the certificate includes a portion that identifies the enterprise application, and wherein executing the configuration application further comprises:

searching a plurality of certificates in the enterprise workspace on the mobile device; and identifying the certificate associated with the enterprise application based on the portion of the certificate that identifies the enterprise application.

* * * * *